No. 654,917. Patented July 31, 1900.
C. F. PERHAM.
CLUTCH MECHANISM.
(Application filed Apr. 17, 1899. Renewed May 31, 1900.)
(No Model.)
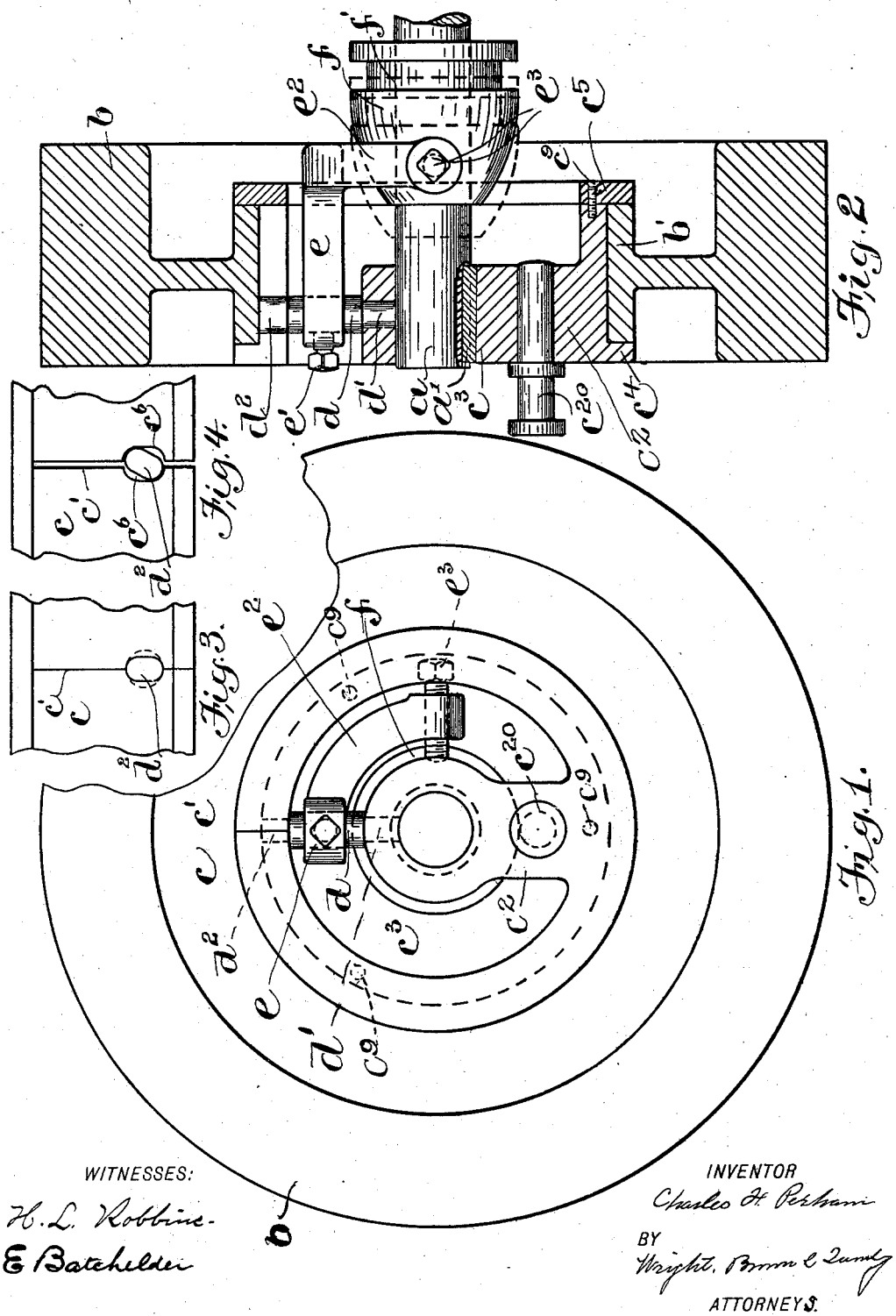
WITNESSES:
H. L. Robbins
E. Batchelder
INVENTOR
Charles F. Perham
BY
Wright, Brown & Quinby
ATTORNEYS.

UNITED STATES PATENT OFFICE.

CHARLES F. PERHAM, OF LOWELL, MASSACHUSETTS.

CLUTCH MECHANISM.

SPECIFICATION forming part of Letters Patent No. 654,917, dated July 31, 1900.

Application filed April 17, 1899. Renewed May 31, 1900. Serial No. 18,640. (No model.)

*To all whom it may concern:*

Be it known that I, CHARLES F. PERHAM, of Lowell, in the county of Middlesex and State of Massachusetts, have invented certain new and useful Improvements in Clutch Mechanism, of which the following is a specification.

This invention has relation to clutch mechanism of the type wherein an expansible ring is employed for connecting the two parts or members which are to be coupled, and while it is particularly designed for employment on looms for connecting the wheel and shaft together, yet it will be understood by those skilled in the art that it is equally applicable for connecting two alined shafts or pulleys.

The invention consists in a clutch mechanism of the type referred to possessing certain features of construction and relative arrangement of parts, as illustrated upon the accompanying drawings, described in the following specification, and set forth in the appended claims.

Reference is to be had to the accompanying drawings, and to the letters marked thereon, forming a part of this specification, the same letters designating the same parts or features, as the case may be, wherever they occur.

Of the drawings, Figure 1 represents in face view one embodiment of my invention. Fig. 2 represents a section through the same. Figs. 3 and 4 show the rotatable device for expanding the friction-ring.

Referring to said drawings, $a$ indicates the shaft, and $b$ the wheel, which comprise the members which it is desired to connect or couple. Between them is interposed a friction-ring $c$, split at $c'$ and connected by a radial inwardly-projecting arm $c^2$ with a hub $c^3$ upon the shaft or member $a$. The hub $c^3$ is rigidly secured to said shaft or member by any suitable means, as a key $a'$. The line of division $c'$ between the two ends of the ring is diametrically opposite the arm $c^2$, as best shown in Fig. 1. The periphery of the ring is constructed to receive a hub $b'$ of the wheel or pulley $b$, and the latter is held against axial movement by a circumferential flange $c^4$ on one end of the ring and by a gib $c^5$ secured to the other end of said ring by screws $c^9$ passing loosely through enlarged apertures or slots in said gib. Under ordinary circumstances the member $b$ is adapted to freely rotate about the ring $c^3$ as a journal; but by expanding the ring the two parts are connected frictionally together to cause their rotation in unison. To accomplish this spreading or expanding of the ring, I employ a pin or rotatable member $d$, having its reduced end $d'$ journaled in an aperture in the hub $c^3$ and arranged axially of the ring diametrically opposite the arm $c^2$. The other end of the pin is flattened, as at $d^2$, and it extends between the two ends of the expansible ring, which are socketed at $c^6$ $c^6$ to receive it. In end view the end of the pin $d^2$ is substantially elliptical, so that by rotating it the two ends of the ring $c$ may be forced apart, as shown in Fig. 4. To accomplish the rotation or partial rotation of the pin $d$, an arm $e$ is secured thereto by a set-screw $e'$, said arm projecting axially beyond the ring $c$ and being provided with a lateral curved arm $e^2$, in the end of which is placed an adjustable set-screw $e^3$, said screw being axial of the shaft or member $a$. A cone $f$, grooved at $f'$ to receive a fork, is mounted to slide upon the shaft $a$ and to engage the end of the screw $e^3$ for the purpose of rocking the arm $e'$ and the pin $d$. When the member $b$ and the expansible ring are disconnected, the parts are in the position shown in full lines in Figs. 2 and 3; but when it is desired to connect them the cone $f$ is moved into the position shown in dotted lines in Fig. 2 to cause a partial rotation of the rotary member or pin $d$, whereupon the end of the pin separates the ends of the split ring, as shown in Fig. 4.

Having thus explained the nature of the invention and described a way of constructing and using the same, although without attempting to set forth all of the forms in which it may be made or all of the modes of its use, I declare that what I claim is—

1. The combination of a shaft, an expansible ring having a hub rigidly secured to the shaft, a radial pin journaled in the hub and having a flattened end adapted to expand said ring, means for rotating said pin, a pulley having its hub journaled upon the periphery of the expansible ring and means on the ring for holding the pulley against axial movement.

2. The combination with a split ring, a hub, and an arm connecting said hub with said ring between the ends thereof, of a rocking pin arranged diametrically opposite said arm, said pin having one end journaled in the hub and its other end flattened and lying between the ends of the split ring, a wheel or other rotatable member encircling the split ring, and means for rocking said pin.

In testimony whereof I have affixed my signature in presence of two witnesses.

CHARLES F. PERHAM.

Witnesses:
M. B. MAY,
H. L. ROBBINS.